United States Patent [19]

McCaslin

[11] 4,151,751

[45] May 1, 1979

[54] ACCELEROMETER

[76] Inventor: Robert E. McCaslin, 1227 Coldwater Canyon, Beverly Hills, Calif. 90210

[21] Appl. No.: 899,440

[22] Filed: Apr. 24, 1978

[51] Int. Cl.² ............................................. G01P 15/02
[52] U.S. Cl. ...................................................... 73/514
[58] Field of Search ..................... 73/514, 515, 516 R, 73/517 R, 492; 200/61.45

[56] References Cited

U.S. PATENT DOCUMENTS 2,802,204  8/1957  Kennelly et al. ............ 200/61.45 M

FOREIGN PATENT DOCUMENTS 458474  12/1936  United Kingdom ....................... 73/514

*Primary Examiner*—James J. Gill
*Attorney, Agent, or Firm*—Townsend and Townsend

[57] ABSTRACT

An accelerator for mounting to a vehicle. The accelerometer includes a pendulum in a housing and an indicating needle rigidly attached to the pendulum. The needle sweeps across a meter face at one end of the housing and the meter face may be calibrated in terms of the forward acceleration of the vehicle. The pendulum has a weight constructed of magnetic material and a small permanent magnet in a fixed position in the housing normally attracts the pendulum from its bottom deadcenter position. This results in a large angular arc through which the pendulum can swing when the pendulum is accelerated with the vehicle, leading to greater overall sensitivity of the accelerometer.

10 Claims, 3 Drawing Figures

U.S. Patent
May 1, 1979
4,151,751
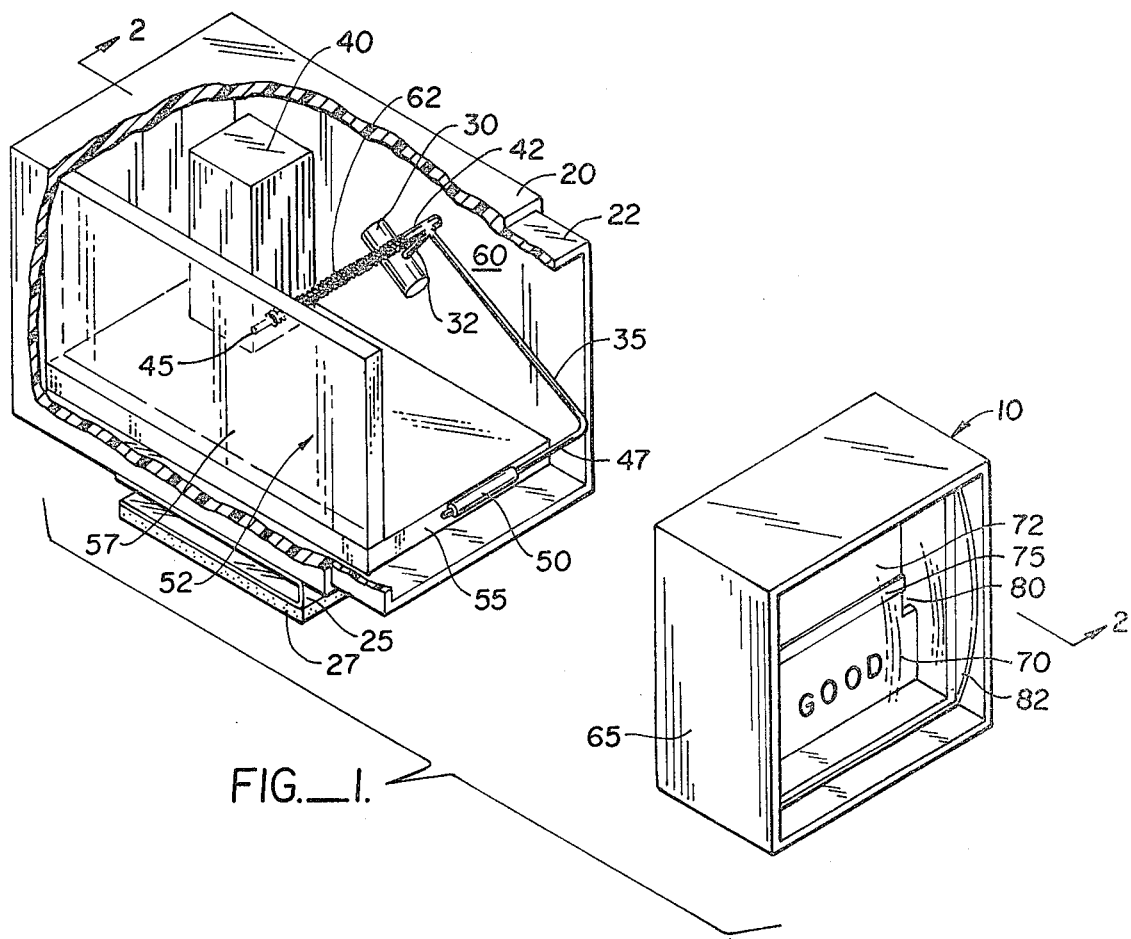
FIG._1.
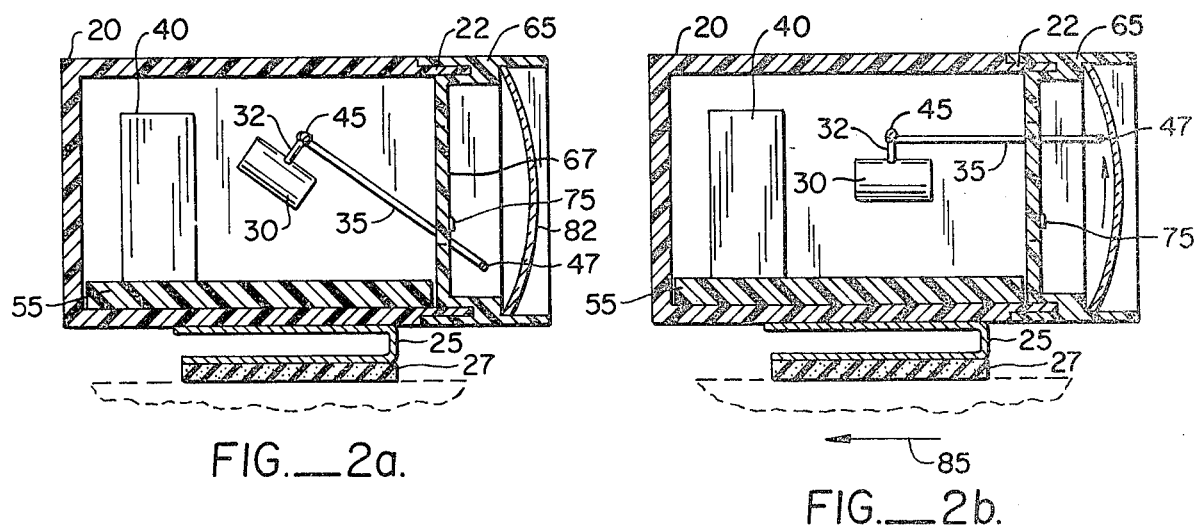
FIG._2a.
FIG._2b.

ACCELEROMETER

This invention relates to improvements in the measurements of acceleration of vehicles and, more particularly, to an accerometer which can be attached to the dashboard or other part of a vehicle.

BACKGROUND OF THE INVENTION

Excessive acceleration of an automobile or other vehicle is undesirable because of greater fuel consumption, more rapid tire wear, and increased strain on the vehicle engine. In addition, rapid acceleration tends to be correlated with unsafe driving practices. However, drivers are often unaware of the fact that they are accelerating at a rate that is likely to have any of these unfortunate effects. Thus, the need is presented for an accelerometer suitable for use in an automobile, to provide an indication of acceleration for the driver who, it is assumed, will then endeavor to maintain the acceleration of the vehicle within tolerable limits.

The use of a pendulum to measure acceleration is well known, with the acceleration being given by the product of the acceleration of gravity and the tangent of the angle of inclination of the vertical assumed by the pendulum. It is sometimes found expedient to have an indicating needle magnetically coupled to the pendulum to provide a reading of acceleration. Disclosures of such devices are found in U.S. Pat. Nos. 2,108,695; 2,154,678; 3,044,306; and 3,395,583. In certain other applications, extreme linearity is a desired or necessary characteristic. U.S. Pat. No. 3,498,138 discloses the use of electromagnets and permanent magnets to apply restoring forces so that the sensing pendulum like member is maintained in a neutral position.

One problem shared by many of the prior art devices is a basic lack of sensitivity due to the limited angular excursion possible. For example, a horizontal acceleration equal to the acceleration of gravity will provide an angular excursion of forty-five degrees. For this reason, a need has arisen for a simple accelerometer which is highly sensitive and which can easily be attached to a vehicle at a location sufficient to permit the accelerometer to fairly accurately measure forward acceleration.

SUMMARY OF THE INVENTION

The present invention satisfies the aforesaid need by providing an accelerometer which is completely mechanical in construction and can readily be attached to the dashboard or other suitable location on a vehicle. To this end, the accelerometer comprises a housing having a pendulum pivotally mounted inside the housing and coupled to an indicating needle which can sweep across a meter face at one end of the housing. The needle may be relatively long compared to the pendulum length. Thus, the tip of the needle swings through a greater linear distance than the pendulum weight itself. The meter face may be calibrated in terms of forward acceleration so that the needle will provide an instantaneous value of forward acceleration of the vehicle.

The pendulum weight itself is constructed of a magnetic material such as iron, and a small permanent magnet is mounted in a fixed position in the housing near the pendulum. Mutual attraction between the magnet and the pendulum causes the pendulum to assume a position normally away from the vertical. When the vehicle to which the accelerometer is mounted accelerates, the pendulum swings away from the magnet because of the inertia of the pendulum weight. A greater angular excursion of the pendulum and the needle is made possible by the fact that the initial position of the pendulum is inclined. This sensitivity is enhanced due to decrease in the magnetic attraction between the pendulum weight and the magnet as the pendulum moves away from the magnet during acceleration of the vehicle. The magnet also has the desirable effect of damping vibrations of the pendulum, thereby making the accelerometer particularly suited for use in an automobile or similar vehicle.

BRIEF DESCRIPTION OF THE DRAWINGS

FIG. 1 is a partially cut-away perspective view of the accelerometer with an end part having a meter face separated from the main housing of the accelerometer.

FIG. 2a is a cross-sectional view taken along line 2—2 of FIG. 1 showing the position of the pendulum and needle under conditions of no acceleration.

FIG. 2b is a view similar to FIG. 2a but showing the pendulum and needle under conditions of acceleration.

DESCRIPTION OF THE PREFERRED EMBODIMENT

FIG. 1 shows the accelerometer partially disassembled with face part 10 removed from housing 20, with housing 20 cut-away to show the inner components of the accelerometer. The accelerometer is designed for use in a vehicle, such as an automobile, for measuring forward acceleration. Any preferences to direction will be taken along the vehicle's normal direction of travel.

The accelerometer mechanism is housed within an outer housing 20, typically an opaque plastic box open at its rearward-facing end and having its rim 22 at rearward-facing end reduced in thickness. Fastened to outer housing 20 on its bottom is mounting bracket 25 which may be a thin flat U-shaped member constructed out of sheet metal. The bottom surface of mounting bracket 25 has a layer 27 of double-sided foam tape, one side being fixed to the bracket, the other side for attaching to the vehicle surface on which the accelerometer is to be mounted, typically the dashboard. Since the invention is a pendulum type accelerometer, it is also sensitive to inclination. Hence, mounting bracket 25 is preferably made of somewhat yieldable or deformable material to allow the user to bend the bracket into a shape to compensate for any inclination of the surface to which the accelerometer is mounted.

The basic elements of the accelerometer are a pendulum 30, constructed out of a magnetic material and mounted on pendulum arm 32, a rearward extending indicating needle 35, and bar magnet 40. Pendulum arm 32 and indicating needle 35 are both connected perpendicular to cylindrical sleeve member 42, and are approximately perpendicular to each other. Sleeve member 42 is free to rotate about horizontal transverse shaft 45 secured at its ends to the housing in any suitable manner. Shaft 45 thereby defines the pendulum's axis of rotation.

Indicating needle 35 is several times longer than pendulum arm 32, typical dimensions being one inch and 1/8-inch, respectively. Indicating needle 35 has a perpendicular portion 47 which is substantially parallel to shaft 45. The pendulum shaft 32 and indicating needle 35 with its perpendicular portion 47 are preferably pieces of wire, and may be formed from a single piece which is bent at two places. Sleeve member 42 may be a small piece of brass tubing to which the wire assembly may be soldered. A small sleeve 50 of brightly colored material, such as electrical wire insulation, is inserted on perpendicular portion 47 to make the position of the needle easier to read at a glance. Bar magnet 40 is mounted forwardly of shaft 45.

To facilitate assembly of the pendulum, L-shaped support bracket 52 is provided, in the housing and is formed of horizontal bottom portion 55 and vertical side portion 57. Support bracket 52 is shown in FIG. 1 as being made of a transparent material such as plastic, but it can be of other material if desired. The maximum dimensions of L-bracket 52 are such that clearance within outer housing element 20 are minimal. Pendulum shaft 45 is mounted in cantilever fashion into a horizontal hole within vertical portion 57, thereby holding shaft 45 against any motion perpendicular to its axis. Axial movement of shaft 45 is prevented by the sides of housing 20. Thus, it is actually unecessary to glue shaft 45 into vertical position 57, although gluing is preferred. Movement of bearing 42 along the shaft is prevented at one end by wall surface 60 of housing 20 that is remote from vertical member 57. Axial movement in the direction toward vertical portion 57 may be prevented by any type of spacer element on shaft 45, such as a plurality of small beads 62. Bar magnet 40 is cemented to horizontal member 55 of L-shaped bracket 52. Thus, the accelerometer components may be assembled on support bracket 52, and the whole assembly then inserted into outer housing 20.

Face part 10 consists of a plastic frame 65 which is adapted to mate with narrow rim portion 22 of housing 20, thereby forming an enclosed structure. Front face 67 may be graduated in terms of acceleration. In the preferred embodiment, a portion 70 of the dial corresponding to low acceleration is colored green and marked "good", while a portion 72 corresponding to high acceleration is colored red. White dividing band 75 divides the two regions. Face 67 has a vertical side slot 80 which allows indicator needle 35 to pass therethrough and swing over its range. Thus, when the accelerometer is assembled, cross portion 47 of indicator needle 35 is on the indicating side of face 72 which is remote from the pendulum and magnet. Transparent face protector 82 fits within frame 65 and protects both face 67 and cross member 47 of indicator needle 35.

With the construction of the accelerometer thus set out, the operation of the device can now be explained. FIG. 2a shows the accelerometer at its rest position, i.e., under conditions of no acceleration. Pendulum weight 30, pendulum shaft 32, and indicating needle 35 form a compound pendulum system which would, in the absence of magnet 40, hang with its center of mass directly below shaft 45. However, the magnetic attraction between pendulum weight 30 and bar magnet 40 pulls the center of mass forward and away from its lowest position so that the pendulum is inclined. Portion 47 of indicating needle 35 is thus held at its lowest or zero position.

FIG. 2b shows a position assumed by the pendulum when the vehicle to which the accelerometer is mounted is subjected to a forward acceleration indicated by arrow 85 in FIG. 2b. The acceleration causes pendulum 32 to move away from magnet 40. Portion 47 of indicating needle 35 moves upwardly and, eventually reaches a position above its zero position, the upper position providing a relative value of the acceleration.

The use of a magnet to bias the pendulum forward of its normally vertical position leads to increased sensitivity for two reasons. First, maximum sensitivity of a pendulum to acceleration occurs at angles of deflection nearest zero, due to the fact that the acceleration force is proportional to the cosine of the angle and the gravitional restoring force is proportional to the sine of the angle. Thus, by biasing the pendulum away from its normally vertical position, increased angular excursion in the vicinity of zero angle is achieved. Secondly, since the magnetic force of attraction between pendulum weight 30 and magnet 40 decreases with distance, any magnet causes a decrease in angular excursion on the side away from the magnet is smaller than the corresponding increase in angular excursion on the side of the vertical toward the magnet.

In addition to providing increased angular excursion, the magnet provides a damping effect on the pendulum, thereby making the accelerometer less sensitive to vibrations that are normally present in an automobile. The mounting by means of foam tape also contributes to this effect.

I claim:

1. An accelerometer for measuring forward acceleration of a vehicle comprising: a support adapted to be mounted on the vehicle; a pendulum pivotally mounted on the support for movement about a generally horizontal axis; indicating means attached to the pendulum for displaying the angular displacement of the pendulum about said axis to provide an indication of acceleration of the support and thereby the vehicle when the support is mounted thereon; and a fixed member carried by the support forwardly of the pendulum and magnetically attracted to the pendulum, the attraction holding the pendulum in a generally inclined position under equilibruim conditions whereby the pendulum will swing away from the member when the support is accelerated.

2. An accelerometer of claim 1 wherein the fixed member is a bar magnet and the pendulum is formed of ferromagnetic material.

3. An accelerometer as set forth in claim 1, wherein said support comprised a housing having an open end and a closure part for removably covering the open end, the closure having a meter face, the indicating means having a portion movable across said meter face.

4. An accelerometer as set forth in claim 1, wherein said pendulum has an arm and a weight on the lower end of the arm, there being a generally horizontal pivot element rotatably mounted on the support, said pendulum arm being secured to said pivot element.

5. An accelerometer as set forth in claim 4, wherein is provided a fixed shaft in the housing, the pivot element being a sleeve rotably mounted on the shaft.

6. An accelerometer as set forth in claim 1, wherein is included a housing having an open end, said support including a bracket insertable in the housing through the open end.

7. An accelerometer as set forth in claim 6, wherein said bracket is L-shaped to present a bottom and a side, the fixed member including a bar magnet mounted on the bottom of the bracket and extending upwardly therefrom, there being a shaft extending laterally from the side of the bracket above said bottom, said pendulum having means pivotally mounting it on the shaft.

8. An accelerometer as set forth in claim 6, wherein said housing has a bottom surface provided with means for mounting the housing on a vehicle.

9. An accelerometer as set forth in claim 8, wherein said mounting means comprises a yieldable U-shaped bracket.

10. An accelerometer as set forth in claim 7, wherein the indicating means includes a needle perpendicular to the shaft, said needle having an end portion parallel to the shaft, said housing having a removable end part provided with a meter face, the end portion of the needle being movable past said meter face.

* * * * *